United States Patent
Chen et al.

(10) Patent No.: US 9,557,831 B2
(45) Date of Patent: Jan. 31, 2017

(54) OPTICAL NAVIGATION METHOD FOR DYNAMICALLY ADJUSTING SIZE OF IMAGE SENSING REGION AND RELATED APPARATUS THEREOF

(71) Applicant: PixArt Imaging Inc., Hsin-Chu (TW)

(72) Inventors: Ching-Chih Chen, Hsin-Chu (TW);
Ming-Tsan Kao, Hsin-Chu (TW);
Chih-Yen Wu, Hsin-Chu (TW);
Chien-Jung Huang, Hsin-Chu (TW);
Yao-Hsuan Lin, Hsin-Chu (TW);
Tzu-Yu Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 188 days.

(21) Appl. No.: 13/890,239

(22) Filed: May 8, 2013

(65) Prior Publication Data

US 2014/0092019 A1 Apr. 3, 2014

(30) Foreign Application Priority Data

Oct. 3, 2012 (TW) .............................. 101136515 A

(51) Int. Cl.
| | |
|---|---|
| G06F 3/033 | (2013.01) |
| G09G 5/08 | (2006.01) |
| G09G 5/00 | (2006.01) |
| G06F 3/0354 | (2013.01) |
| G06F 3/03 | (2006.01) |

(52) U.S. Cl.
CPC ......... G06F 3/03543 (2013.01); G06F 3/0317 (2013.01)

(58) Field of Classification Search
CPC ............. G03G 7/40; H02J 5/005; H02J 17/00; B60L 11/182; B65H 2220/01; B65H 2220/02; B65H 2511/20; B65H 2513/42; B65H 2220/03; G11B 2007/24312; G11B 2007/24314; G11B 2007/24316; G11B 7/24

See application file for complete search history.

(56) References Cited

U.S. PATENT DOCUMENTS

| | | | | |
|---|---|---|---|---|
| 2005/0134583 | A1* | 6/2005 | Kokojima et al. ............. | 345/419 |
| 2007/0262243 | A1* | 11/2007 | Cheah et al. ......... | G06F 1/3215 250/214 R |
| 2009/0223290 | A1* | 9/2009 | Dietz .................. | G01F 23/2924 73/293 |
| 2010/0283752 | A1* | 11/2010 | Maeda .......................... | 345/173 |
| 2011/0007030 | A1* | 1/2011 | Mo et al. ...................... | 345/174 |
| 2013/0063375 | A1* | 3/2013 | Yoshida et al. ............... | 345/173 |

* cited by examiner

*Primary Examiner* — Alexander Eisen
*Assistant Examiner* — Nan-Ying Yang
(74) *Attorney, Agent, or Firm* — Winston Hsu; Scott Margo

(57) ABSTRACT

An optical navigation method includes: detecting inertia of an image of a feature point; and determining an effective sensing region of an image sensing array according to the detected inertia for reducing power consumption. Besides, an optical navigation apparatus includes a detecting circuit and a determining unit. The detecting circuit is arranged for detecting a moving inertia of a feature point. The determining circuit is coupled to the detecting circuit, and arranged for determining an effective sensing region of an image sensing array according to the detected moving inertia for reducing power consumption.

18 Claims, 13 Drawing Sheets

OPTICAL NAVIGATION METHOD FOR DYNAMICALLY ADJUSTING SIZE OF IMAGE SENSING REGION AND RELATED APPARATUS THEREOF

BACKGROUND OF THE INVENTION

1. Field of the Invention

The disclosed embodiments of the present invention relate to an optical processing mechanism, and more particularly, to an optical navigation method and related apparatus thereof which adjust the size of an image sensing region dynamically to reduce power consumption.

2. Description of the Prior Art

Generally, an optical navigation system has at least an image sensing array utilized to detect an image moving location of a feature point. In the prior art, all of the sensing units in the image sensing array are turned on for detecting the image location of the feature point. However, the optical navigation system is usually disposed in a portable device. Turning on all of the sensing units/components would greatly consume the power of the portable device, resulting in high power consumption issues.

SUMMARY OF THE INVENTION

Thus, one of the objectives of the present invention is to provide an optical navigation apparatus and related method thereof which can adjust the size and range of an effective sensing region of an image sensing array dynamically to solve the problems encountered by the conventional designs.

According to an embodiment of the present invention, an optical navigation method is disclosed. The optical navigation method includes: detecting a moving inertia of a feature point; and determining an effective sensing region of an image sensing array to reduce power consumption according to the detected moving inertia.

According to another embodiment of the present invention, an optical navigation apparatus is disclosed. The optical navigation apparatus includes a detecting circuit and a determining circuit. The detecting circuit is arranged for detecting a moving inertia of a feature point. The determining circuit is coupled to the detecting circuit, and is arranged for determining an effective sensing region of an image sensing array to reduce power consumption according to the detected moving inertia.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
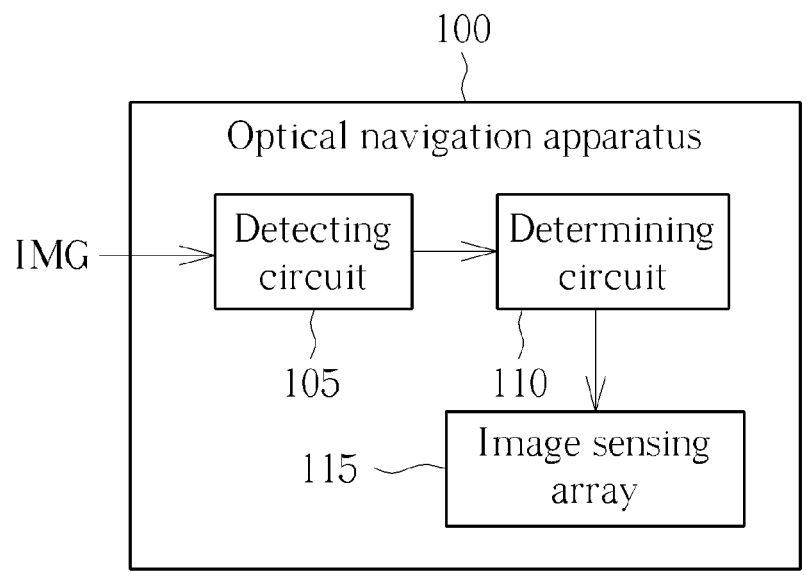
FIG. 1 is a block diagram illustrating an optical navigation apparatus according to an embodiment of the present invention.
Figure 2:
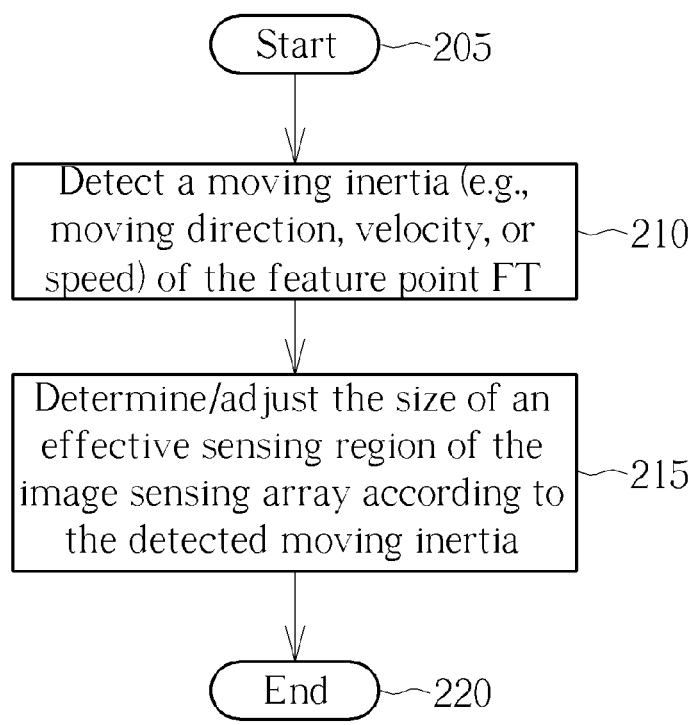
FIG. 2 is a flowchart illustrating a basic operation of the optical navigation apparatus shown in FIG. 1.

Please refer to FIG. 1 in conjunction with FIG. 2. FIG. 1 is a block diagram illustrating an optical navigation apparatus 100 according to an embodiment of the present invention, and FIG. 2 is a flowchart illustrating a basic operation of the optical navigation apparatus 100 shown in FIG. 1. The optical navigation apparatus 100 includes a detecting circuit 105, a determining circuit 110, and an image sensing array 115. The detecting circuit 105 is arranged for capturing a plurality of images IMG of a feature point FT at different timing, and detecting a moving inertia (e.g., moving direction, velocity, or speed) of the feature point FT, for example, by detecting the moving direction or moving velocity of the feature point FT (step 210). The corresponding movement of the feature point FT is caused by the actual movement of the optical navigation apparatus 100; therefore, the operation of detecting the moving inertia of the feature point FT is equivalent to detecting the moving inertia of the optical navigation apparatus 100. The determining circuit 110 is coupled to the detecting circuit 105, and used for determining/adjusting the size of an effective sensing region of the image sensing array 115 according to the detected moving inertia to thereby reduce overall power consumption (step 215). The determining circuit 110 can adjust the size of the effective sensing region of the image sensing array 115 dynamically at different timing according to the variation of the inertia of the feature point FT, thus optimizing the power consumption reduction and the detection of the feature points FT. In addition, in this embodiment, the optical navigation apparatus 100 is implemented by an optical mouse. However, this is not a limitation of the present invention. That is, any other optical sensing components may also be employed to achieve the same objective.

Figure 3A:
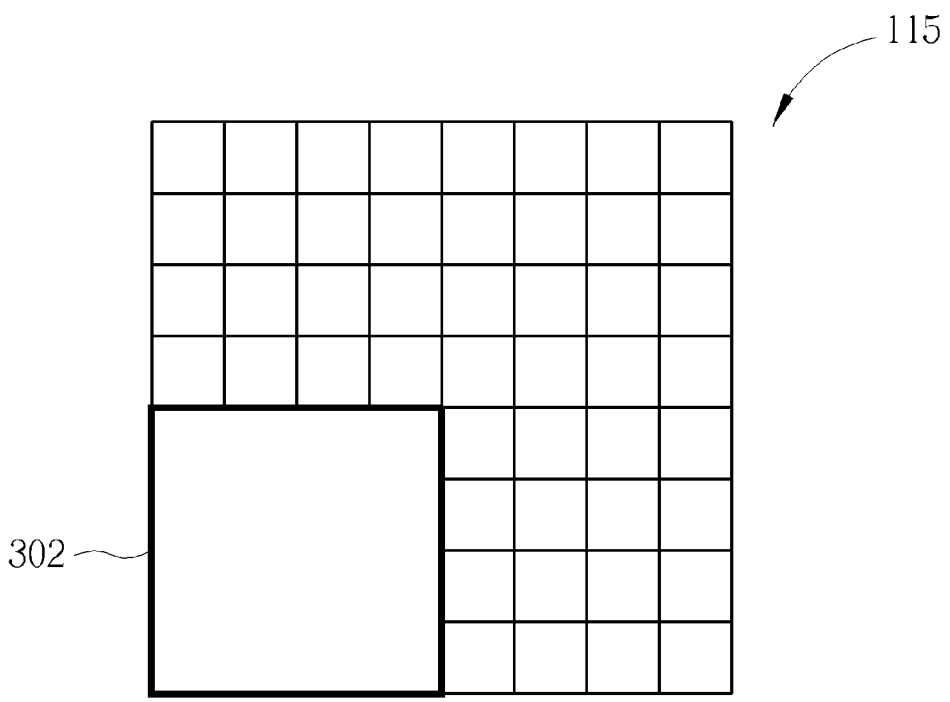
FIG. 3A is a diagram illustrating the image detection range determined/adjusted by the determining circuit according to an embodiment of the present invention.

The size of the effective sensing region which the determining circuit 110 adjusts is the image detection range for displacement operation which the image sensing array 115 performs, and the determining circuit 110 adjusts the image detection range of the displacement operation dynamically according to the received moving inertia result of the feature point FT. Please refer to FIG. 3A-FIG. 3C, which are diagrams illustrating the image detection range determined/adjusted by the determining circuit 110 according to different embodiments of the present invention. As shown in FIG. 3A, the image sensing array 115 includes 64 sensing units arranged in a 8×8 matrix form, and the 64 sensing units represent the detection range of the image sensing array 115 for detecting the location of the feature point FT. As long as the feature point FT moves within the detection range of the image sensing array 115, the image sensing array 115 would be able to detect the movement of the feature point FT. However, in the conventional design, all of the sensing units will be turned on each time the detection of the location of the feature point FT is activated, which wastes a considerable amount of power (i.e., higher power consumption); therefore, in order to reduce power consumption, when the moving inertia detected by the detecting circuit 105 indicates the moving direction, velocity or speed of the feature point FT, the determining circuit 110 will estimate the likely candidate location(s) (which may be one or more than one) within the image sensing array 115 at the next timing according to the detected moving inertia, and then turn on part of the sensing units of the image sensing array 115. As shown in FIG. 3A, a thick frame region 302 is the effective sensing region of the sensing units of the image sensing array 115 determined by the determining circuit 110 (i.e., the turned-on sensing unit region). The thick frame region 302 includes 16 sensing units which are turned on and arranged in a 4×4 matrix form. Due to the fact that only part of the sensing units is turned for detecting the location of the feature point FT, the embodiment shown in FIG. 3A can reduce power consumption greatly when compared to the conventional design which turns on all of the sensing units of the image sensing array 115 for detecting the location of the feature point FT. Please note that the location of the feature point FT at the next timing may have a plurality of possible candidate locations in different directions, and the effective sensing region determined by the determining circuit 110 may encompass the candidate locations and a plurality of corresponding neighboring regions. In other words, the determining circuit 110 can determine the range and size of the effective sensing region according to the candidate locations and the corresponding neighboring regions.

Figure 3B:
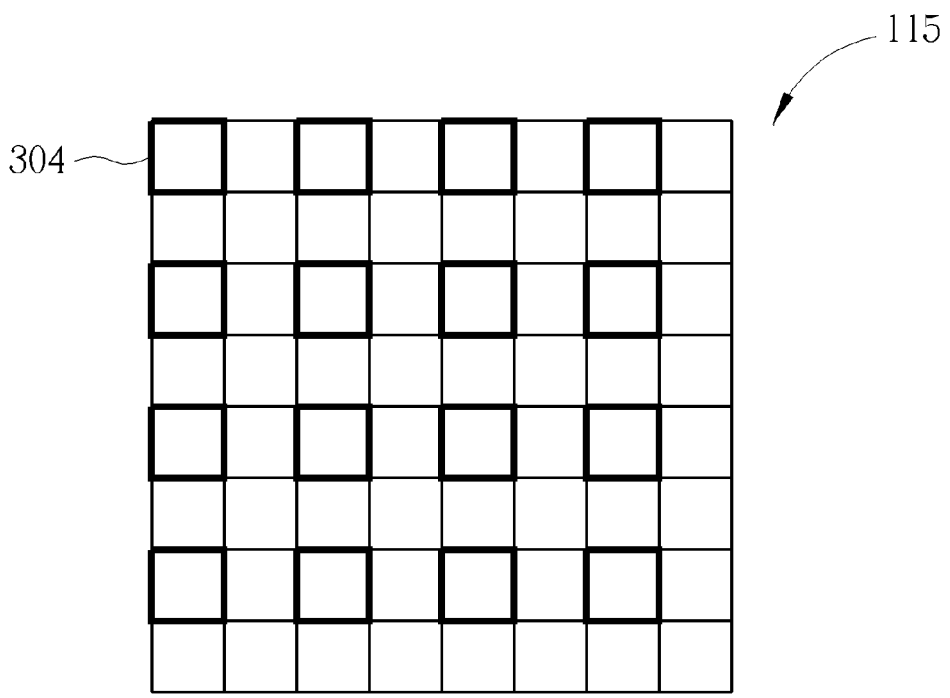
FIG. 3B is a diagram illustrating the image detection range determined/adjusted by the determining circuit according to another embodiment of the present invention.
Figure 3C:
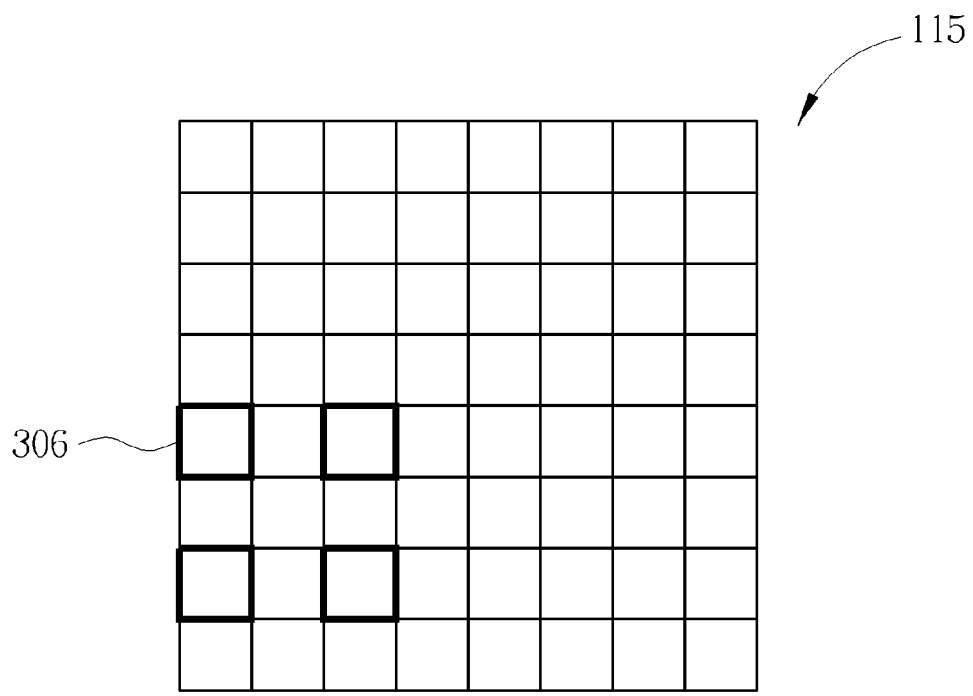
FIG. 3C is a diagram illustrating the image detection range determined/adjusted by the determining circuit according to yet another embodiment of the present invention.

It should be noted that the sensing units in the thick frame region 302 shown in FIG. 3A (i.e., the effective sensing region) are arranged closely adjacent to each other; however, the effective sensing region can also be composed by sensing units not closely adjacent to each other. As shown in FIG. 3B, the effective sensing region 304 is composed of sensing units marked by 16 thick frames, and the turned-on sensing units are not closely adjacent to each other. In other words, as shown in FIG. 3B, there is at least one sensing unit not turned on between two turned-on sensing units. Therefore, the effective sensing region may be regarded as an equivalent region composed of 16 sensing units spaced regularly. In addition, in other embodiments, the effective sensing region 306 as shown in FIG. 3C may be composed of four sensing units represented by thick frames, respectively. It should be noted that the effective sensing regions of the embodiments in FIG. 3A-FIG. 3C are for illustrative purpose only, not limitations of the present invention.

Figure 4A:
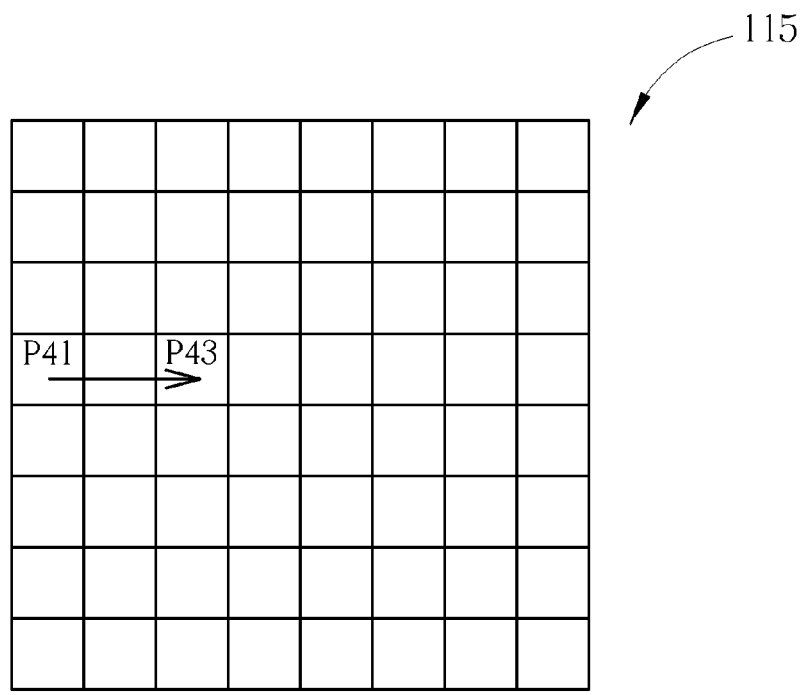
FIG. 4A is a diagram illustrating the movement of the feature point.
Figure 4B:
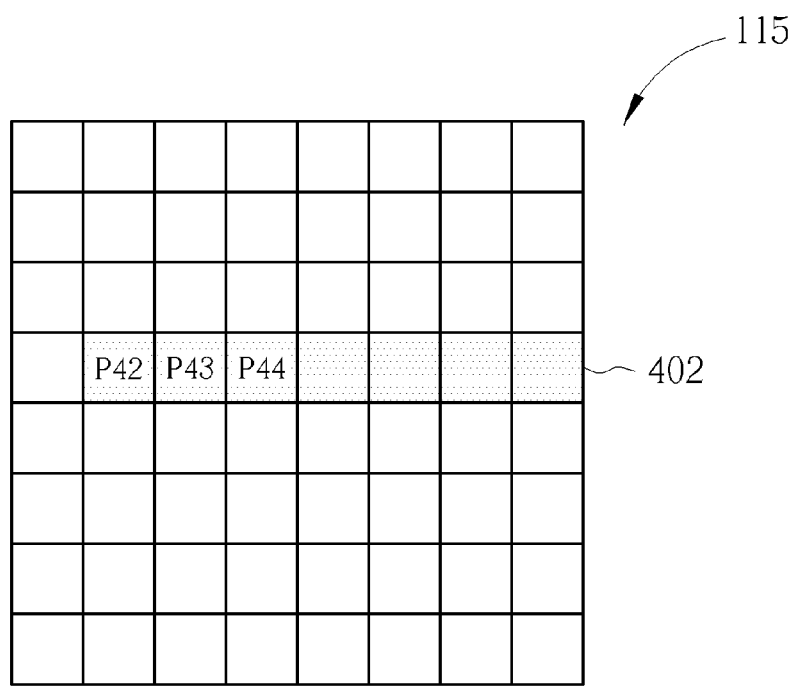
FIG. 4B is a diagram illustrating one effective sensing region determined by the determining circuit according to the moving direction of the feature point shown in FIG. 4A.

Please refer to FIG, 4A, which is a diagram illustrating the operation of the optical navigation apparatus 100 according to the first embodiment of the present invention. As shown in FIG. 4A, the feature point FT is located at location P41. Actually, for each timing, the feature point FT moves straight toward the right at the speed of two times the distance between adjacent sensing units . In fact, the feature point FT will move to location P43 at the next timing. In this embodiment, the detecting circuit 105 only detects the moving direction of the feature point FT to generate its moving inertia result. Hence, the result indicates the moving inertia of the feature point FT is moving straight toward the right. Then, the detecting circuit 105 will output the moving inertia result which indicates that the feature point FT moves straight toward the right to the determining circuit 110 as a reference for appropriately adjusting the size of the effective sensing region. Please refer to FIG. 4B, which is a diagram illustrating an effective sensing region 402 determined by the determining circuit 110 according to the moving direction of the feature point FT shown in FIG. 4A. The moving inertia result detected by the detecting circuit 105 indicates that the feature points FT moves straight toward the right, and the determining circuit 110 determines that the possible location of the feature point FT at the next timing falls at the straight right side of the location at the previous timing. Thus, the determining circuit 110 determines that the effective sensing region at the next timing should be adjusted to the range as illustrated by the screen tone region 402. Therefore, if the moving inertia of the feature point FT remains unchanged (i.e., the moving direction remains unchanged), no matter whether the feature point FT moves fast or slowly, the location of the feature point FT at the next timing will still fall within the screen tone region 402 as long as it is within the detection range of the image sensing array 115. For example, if the moving velocity of the feature points FT is equal to two times the distance between adjacent sensing units, then the location at the next timing is located at location P43. Even though the moving velocity of the feature point FT suddenly changes and therefore the location at the next timing moves to the location of other sensing unit (e.g., P42 or P44). However, the exact location of the feature point FT will still be detected due to the fact that the effective sensing region 402 includes a region having all the sensing units located at the right side of the original feature point FT (i.e., the location P41). Thus, through dynamically turning on a partial sensing unit region of the image sensing array 115, the optical navigation apparatus 100 can detect the exact location of the feature point FT with the advantage/benefit of reduced overall power consumption.

Figure 4C:
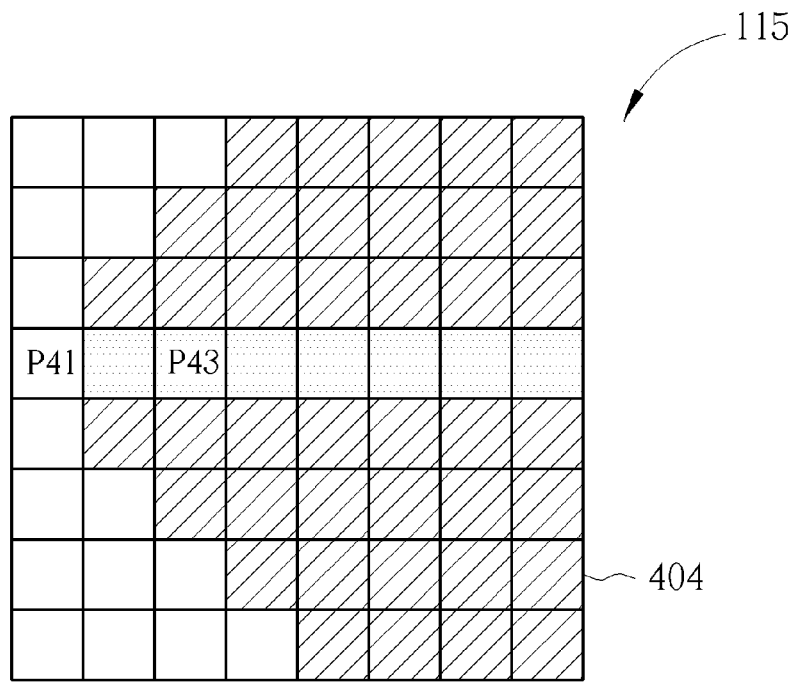
FIG. 4C is a diagram illustrating another effective sensing region determined by the determining circuit according to the moving direction of the feature point shown in FIG. 4A.

In addition, when the moving inertia result of the feature point FT detected by the detecting circuit 105 indicates that the feature point FT moves straight toward the right, the determining circuit 110 may also determine to increase the range of the effective sensing region to increase the possibility of identifying the exact location of the feature points FT. Please refer to FIG. 4C, which is another diagram illustrating an effective sensing region 404, including the hatched region and the screen tone region, determined by the determining circuit 110 according to the moving direction of the feature point FT shown in FIG. 4A. The determining circuit 110 determines that the possible location of the feature point FT at the next timing may be just on the right side of the location P41 at the previous timing, and therefore determines the effective sensing region at the next timing should be adjusted to have the range illustrated by the region 404 (i.e., the sector-shaped radial region). The range of the region 404 shown in FIG. 4C is greater than that of the screen tone region 402 shown in FIG. 4B. Therefore, the probability of identifying the exact location of the feature point FT at the next timing will be increased. If the moving inertia of the feature point of FT remains unchanged (i.e., the moving direction keeps the same), no matter whether the feature point FT moves fast or slowly, the location of the feature point FT at the next timing will also fall within the region 404 as long as it still falls within the detection range of the image sensing array 115. For example, if the moving velocity of the feature point FT is equal to two times the distance between adjacent sensing units, the location at the next timing falls in the sensing unit P43 within the region 404. Even though the moving velocity of the feature point FT suddenly changes to make the location at the next timing fall in a location of the other sensing unit (e.g., P42 or P44), the exact location of the feature points FT can be effectively detected because the effective sensing region 404 includes the sector-shaped radial region on the right side of the original feature point P41. In addition, if the moving inertia of the feature point FT slightly changes (for example, the moving direction is changed from a straight right direction to an upper right direction or a lower right direction), no matter whether the feature point FT moves fast or slowly, the location of the feature point FT at the next timing will also fall within the region 404 as long as it still falls within the detection range of the image sensing array 115. Thus, through dynamically turning on a partial sensing unit region of the image sensing array 115, the optical navigation apparatus 100 can detect the exact location of the feature point FT with the advantage/benefit of reduced overall power consumption. Compared with the region 402, the region 404 (including the screen tone region and the hatched region) has the extra sensing unit range which may be regarded as an estimation error range used to compensate for the possible direction deviation between the predicted moving inertia and the actual moving inertia, so that the feature point FT can still be detected at the next timing.

Figure 4D:
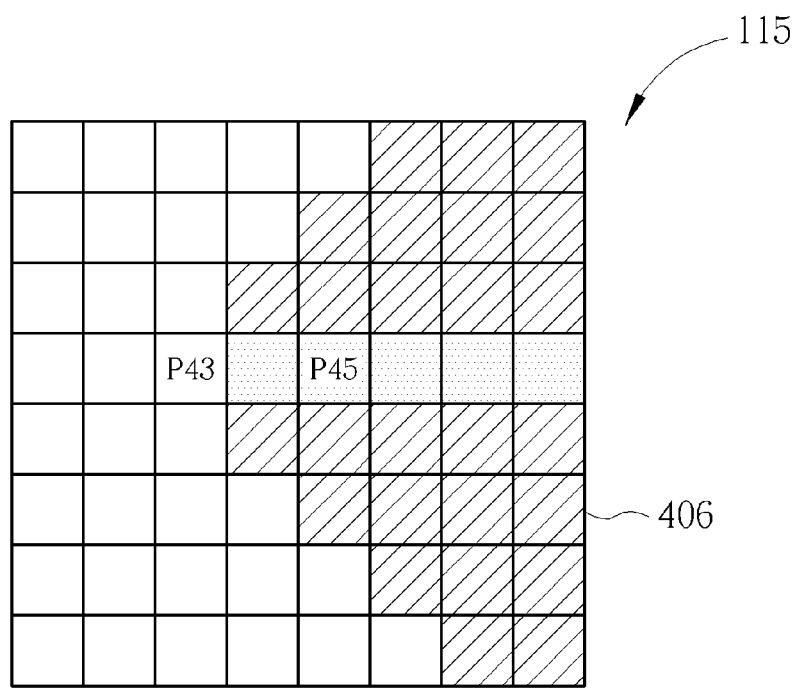
FIG. 4D is a diagram illustrating an effective sensing region determined by the determining circuit at the next timing after the region is determined.

Please refer to FIG. 4D, which is a diagram illustrating an effective sensing region 406, including the hatched region and the screen tone region, determined by the determining circuit 110 at the next timing after the region 404 is determined. In fact, the feature points FT moves from the location P43 to the location P45 as shown in FIG. 4D, and the detecting circuit 105 detects the moving direction of the feature points FT to be a straight right direction, the determining circuit 110 therefore determines that the possible location of the feature point FT at the next timing falls on the direct right side of the location at the previous timing, and the effective sensing region at the next timing should be adjusted to a range illustrated by the region 406 (i.e., a sector-shaped radial region).

Figure 5A:
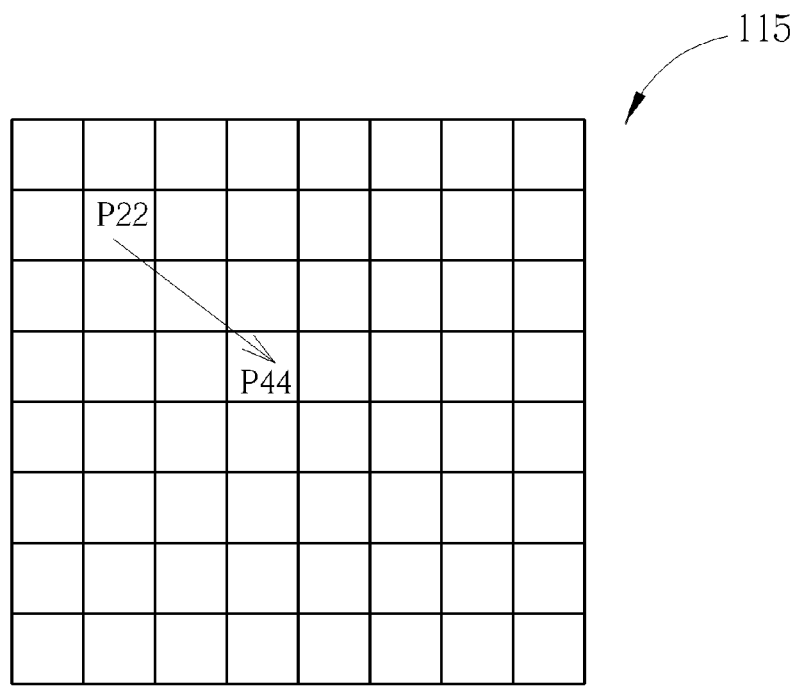
FIG. 5A is diagram illustrating another movement of the feature point.
Figure 5B:
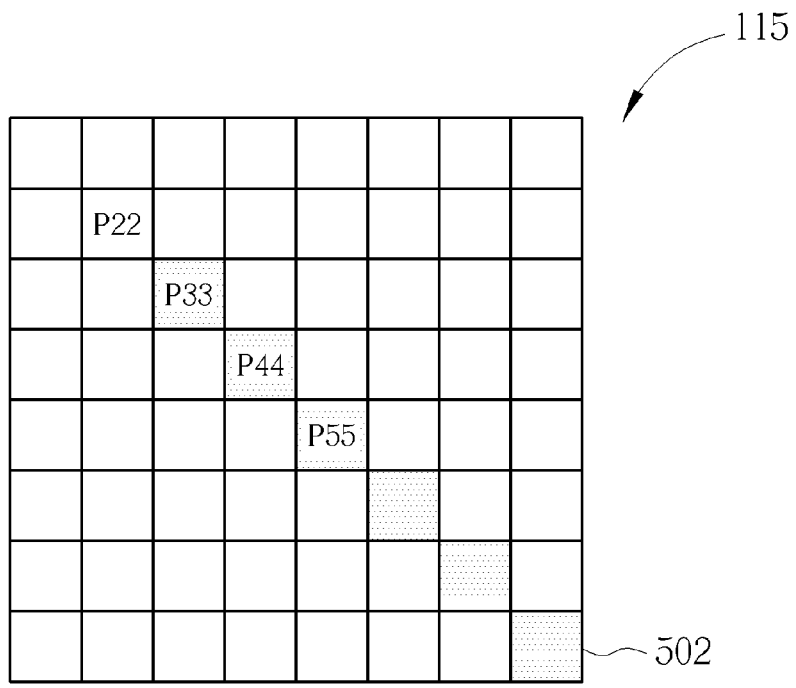
FIG. 5B is a diagram illustrating one effective sensing region determined by the determining circuit according to the moving direction of the feature point shown in FIG. 5A.

Please refer to FIG. 5A, which is a diagram illustrating the operation of the optical navigation apparatus 100 according to the second embodiment of the present invention. As shown in FIG. 5A, in fact, the feature point FT is located at location P22 at the previous timing, and located at location P44 at the next timing. That is, the feature point FT moves from the location P22 to the location P44, and its moving direction is a lower right direction. The detecting circuit 105 detects that the inertial of the feature point FT is moving toward the lower right, the detecting circuit 105 will output the moving inertia result which indicates that the feature point FT moves toward the lower right to the determining circuit 110 as a reference for the determining circuit 110 to appropriately adjust the size of the effective sensing region. Please refer to FIG. 5B, which is a diagram illustrating an effective sensing region 502 (illustrated by the screen tone region) determined by the determining circuit 110 according to the moving direction of the feature point FT shown in FIG. 5A. The moving inertia result of the feature point FT detected by the detecting circuit 105 indicates that the feature point FT moves toward the lower right, and the determining circuit 110 determines that the possible location of the feature point FT at the next timing falls on the bottom side of the location at the previous timing. Thus, the determining circuit 110 determines that the effective sensing region at the next timing should be adjusted to the range illustrated by the screen tone region 502. Therefore, if the moving inertia of the feature point FT remains unchanged (i.e., the moving direction remains unchanged), no matter whether the feature point FT moves fast or slowly, the location of the feature point FT at the next timing will still fall within the screen tone region 502 as long as it is within the detection range of the image sensing array 115. For example, if the moving velocity of the feature points FT is equal to two times the distance between adjacent sensing units, the location at the next timing is located at location P44. Even though the moving velocity of the feature point FT suddenly changes to therefore make the location at the next timing fall at the location of other sensing unit (e.g., P33 or P55), the exact location of the feature point FT will still be detected due to the fact that the effective sensing region 502 includes a straight line shaped sensing unit region located on the lower right side of original feature point FT (i.e., the location P22). Thus, through dynamically turning on a partial sensing unit region of the image sensing array 115, the optical navigation apparatus 100 can detect the exact location of the feature point FT with the advantage/benefit of reduced overall power consumption.

Figure 5C:
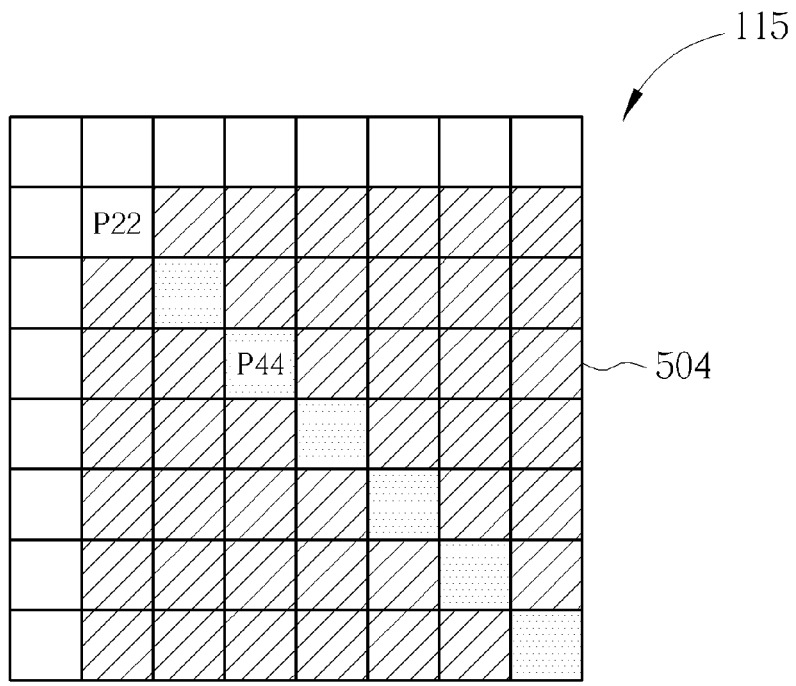
FIG. 5C is a diagram illustrating another effective sensing region determined by the determining circuit according to the moving direction of the feature point shown in FIG. 5A.

In addition, when moving inertia of the feature point FT detected by the detecting circuit 105 indicates that the feature point FT moves toward the lower right, the determining circuit 110 may also determine to increase the range of the effective sensing region to increase the possibility of identifying the exact location of the feature points FT. Please refer to FIG. 5C, which is another diagram illustrating an effective sensing region 504, including the hatched region and the screen tone region, determined by the determining circuit 110 according to the moving direction of the feature point FT shown in FIG. 5A. The determining circuit 110 determines that the possible location of the feature point FT at the next timing falls on the lower right side of the location P22 at the previous timing, and determines the effective sensing region at the next timing should be adjusted as a range illustrated by the region 504 (i.e., a sector-shaped radial region). The range of the region 504 shown in FIG. 5C is greater than that of the screen tone region 502 shown in FIG. 5B. Therefore, the probability of identifying the exact location of the feature point FT at the next timing will be increased. If the moving inertia of the feature point of FT remains unchanged (i.e., the moving direction keeps the same), no matter whether the feature point FT moves fast or slowly, the location of the feature point FT at the next timing will also fall within the region 504 as long as it still falls within the detection range of the image sensing array 115. For example, if the moving velocity of the feature point FT is equal to two times the distance between adjacent sensing units, the location at the next timing is located at the sensing unit P44 within the region 504. Even though the moving velocity of the feature point FT suddenly changes to make the location at the next timing fall at a location of the other sensing unit (e.g., P33 or P55), the exact location of the feature points FT can be effectively detected because the effective sensing region 504 includes the sector-shaped radial region on the lower right side of the original feature point P22. In addition, if the moving inertia of the feature point FT slightly changes (e.g., the moving direction is changed), no matter whether the feature point FT moves fast or slowly, the location of the feature point FT at the next timing will also fall within the region 504 as long as it still falls within the detection range of the image sensing array 115. Thus, through dynamically turning on a partial sensing unit region of the image sensing array 115, the optical navigation apparatus 100 can detect the exact location of the feature point FT with the advantage/benefit of reduced overall power consumption. When compared with the region 502, the region 504 (including the screen tone region and the hatched region) has the extra sensing unit range which may be regarded as the estimation error range used to compensate for the possible direction deviation between the predicted moving inertia and the actual moving inertia, so that the feature point FT can still be detected at the next timing.

Figure 5D:
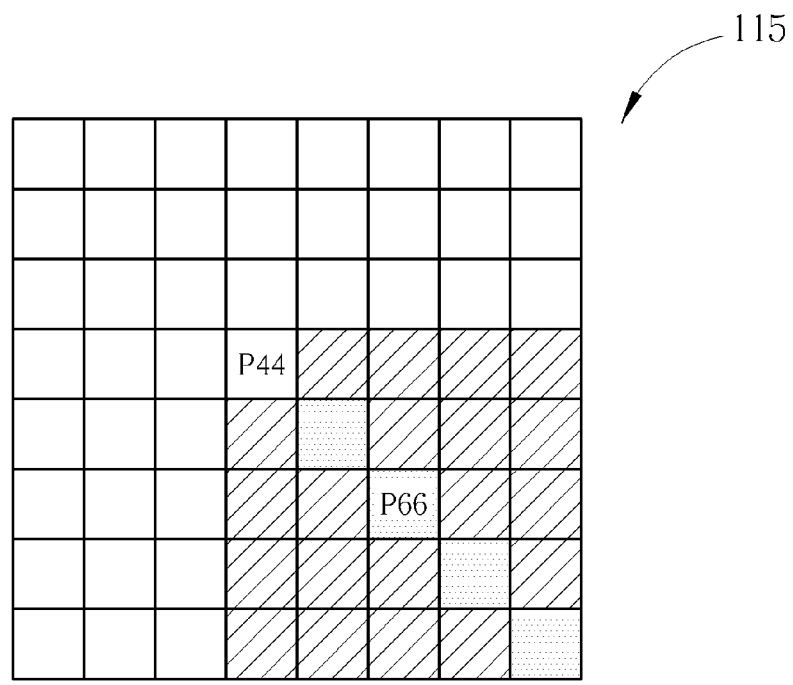
FIG. 5D is a diagram illustrating yet another effective sensing region determined by the determining circuit according to the moving direction of the feature point shown in FIG. 5A.

Please refer to FIG. 5D, which is another diagram illustrating an effective sensing region 506, including the hatched region and the screen tone region, determined by the determining circuit 110 according to the moving direction of the feature point FT. The feature points FT was located at the location P44 at the previous timing, and the detecting circuit 105 detects that the possible location of the feature point FT is located on the lower right side of the location at the previous timing, and therefore determines that the effective sensing region at the next timing should be adjusted as a range illustrated by the region 506 (i.e., the sector-shaped radial region).

Figure 6A:
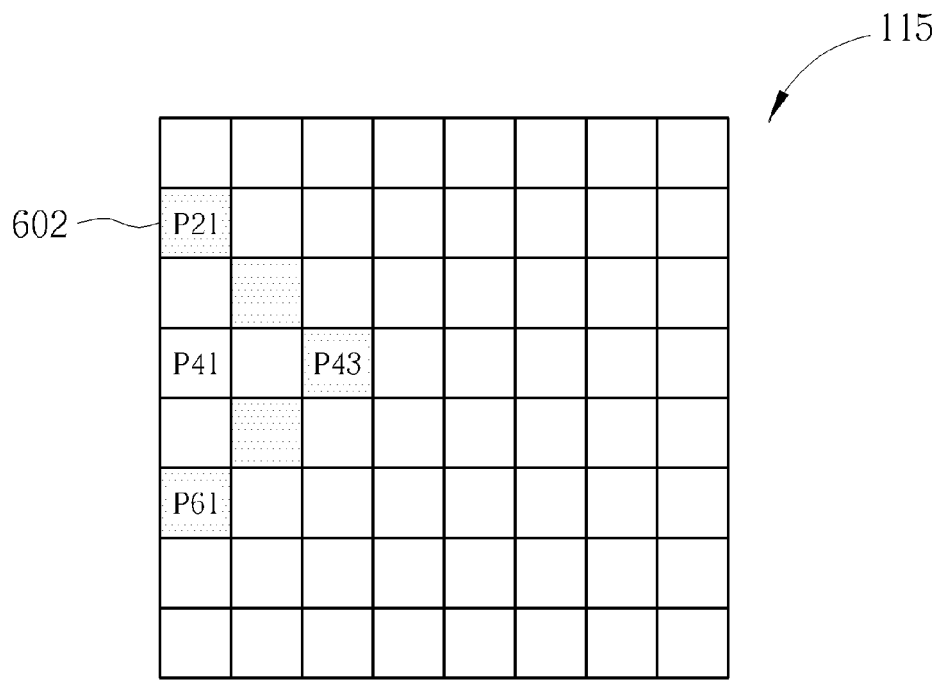
FIG. 6A is a diagram illustrating an effective sensing region determined by the determining circuit according to the moving velocity of the feature point shown in FIG. 4A.

Furthermore, the moving inertial may be a moving direction or a moving velocity. Please refer to FIG. 4A again. The feature point FT is located at the location P41 currently. In fact, the feature point FT moves straight toward the right at a speed of two times the distance between adjacent sensing units. Hence, the feature point FT will move to the location P43 at the next timing. In this embodiment, the detecting circuit 105 will output the moving inertia result (i.e., the moving velocity result) which indicates a moving velocity to the determining circuit 110 as a reference for the determining circuit 110 to appropriately adjust the size of the effective sensing region. Please refer to FIG. 6A, which is a diagram illustrating an effective sensing region 602 (as illustrated by the screen tone region) determined by the determining circuit 110 according to the moving velocity of the feature point FT shown in FIG. 4A. The moving velocity result of the feature point FT detected by the detecting circuit 105 indicates that the feature points FT has a specific moving velocity. For instance, the determining circuit 105 detects that the moving velocity of the feature point FT is two times the distance between sensing units, as shown in FIG. 6A. The determining circuit 110 determines that the possible location of the feature point FT at the next timing falls at a location around the location P41 at the previous timing according to the moving velocity of the feature point FT. Thus, the determining circuit 110 determines that the effective sensing region at the next timing should be adjusted to a range illustrated by the screen tone region 602. Therefore, if the moving inertia of the feature point FT remains unchanged (i.e., the moving velocity remains unchanged), the location of the feature point FT at the next timing will fall within the screen tone region 602. For example, if the moving velocity of the feature points FT is equal to two times the distance between adjacent sensing units in the straight right direction, the location at the next timing is located at the location P43 within the screen tone region 602. Even though the moving direction of the feature point FT suddenly changes to therefore make the location at the next timing fall at the location of other sensing unit (e.g., P21 or P61), the exact location of the feature point FT will still be detected due to the fact that the effective sensing region 602 includes a sensing unit region around the original feature point FT.

Figure 6B:
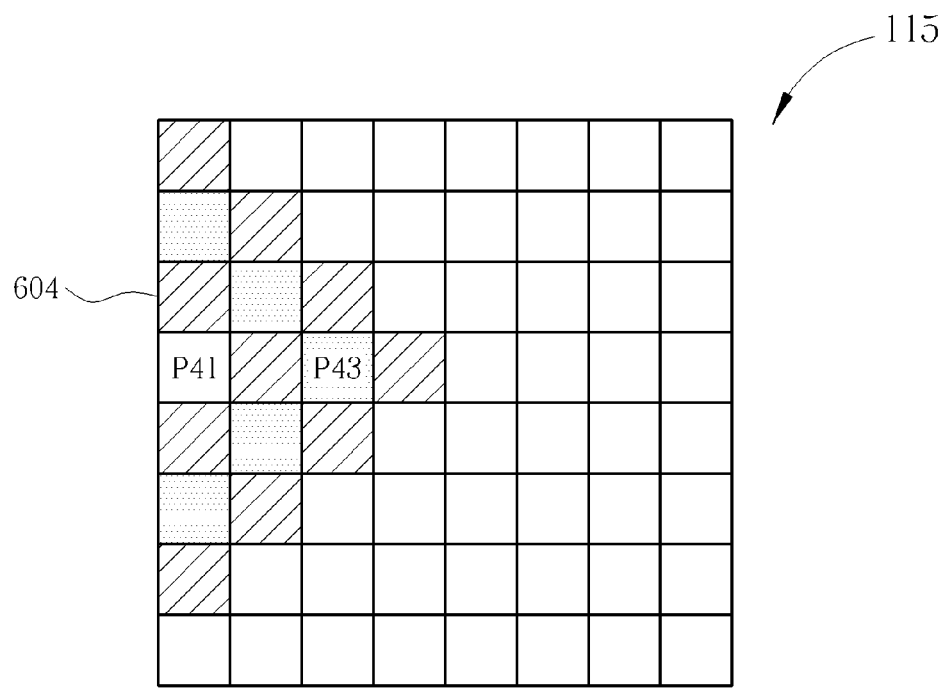
FIG. 6B is another diagram illustrating an effective sensing region determined by the determining circuit according to the moving velocity of the feature point shown in FIG. 4A.

In addition, the determining circuit 110 may also determine a greater range of the effective sensing area for increasing the probability of identifying the exact location of the feature point FT. Please refer to FIG. 6B, which is another diagram illustrating an effective sensing region 604, including the hatched region and the screen tone region, determined by the determining circuit 110 according to the moving velocity of the feature point FT shown in FIG. 4A. The determining circuit 110 determines that the possible location of the feature point FT at the next timing falls at a location around the location P41 at the previous timing, and therefore determines that the effective sensing region at the next timing should be adjusted as a range illustrated by the region 604. Equivalently, the region 604 includes the sensing units of the screen tone region 602 and the neighboring sensing units of the hatched region. Therefore, the probability of identifying the exact location of the feature point FT at the next timing will be increased. It should be noted that, compared with the region 602, the region 604 has the extra sensing unit range (i.e., the hatched region) which may be regarded as the estimation error range used to compensate for the possible direction deviation between the predicted moving inertia and the actual moving inertia, so that the feature point FT can still be detected at the next timing. In this way, the possibility of failing to detect the feature point FT is reduced.

Figure 6C:
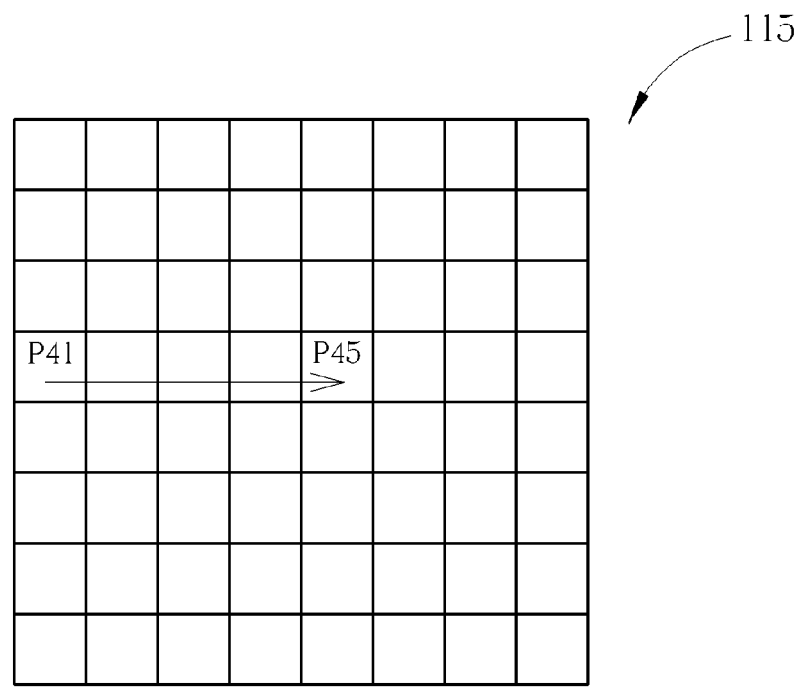
FIG. 6C is a diagram illustrating the feature points moving at a different moving velocity.
Figure 6D:
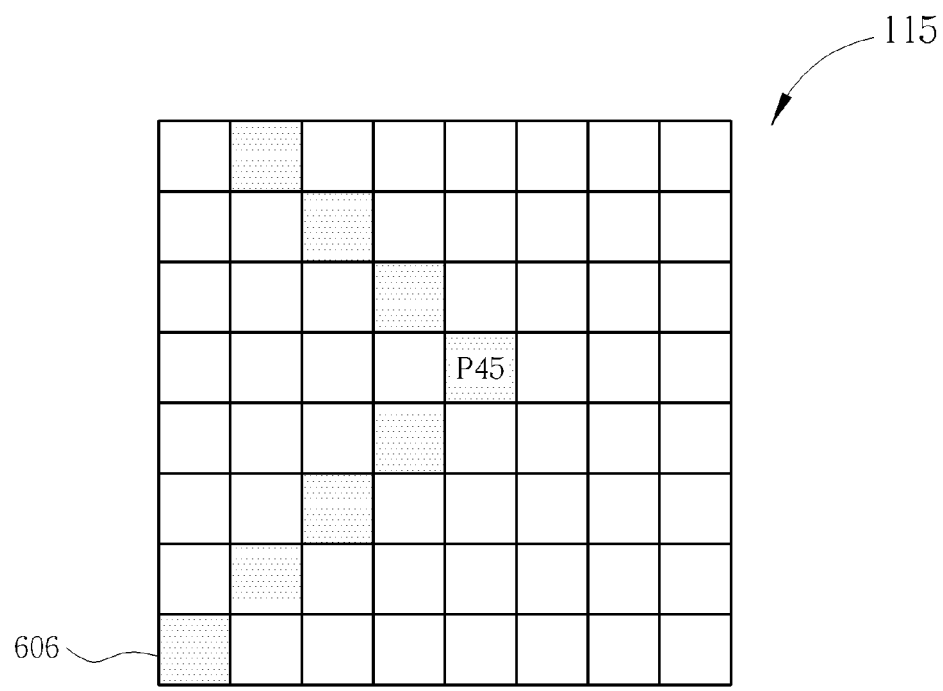
FIG. 6D is a diagram illustrating an effective sensing region determined by the determining circuit according to the moving inertia results of the feature point shown in FIG. 6C.
Figure 6E:
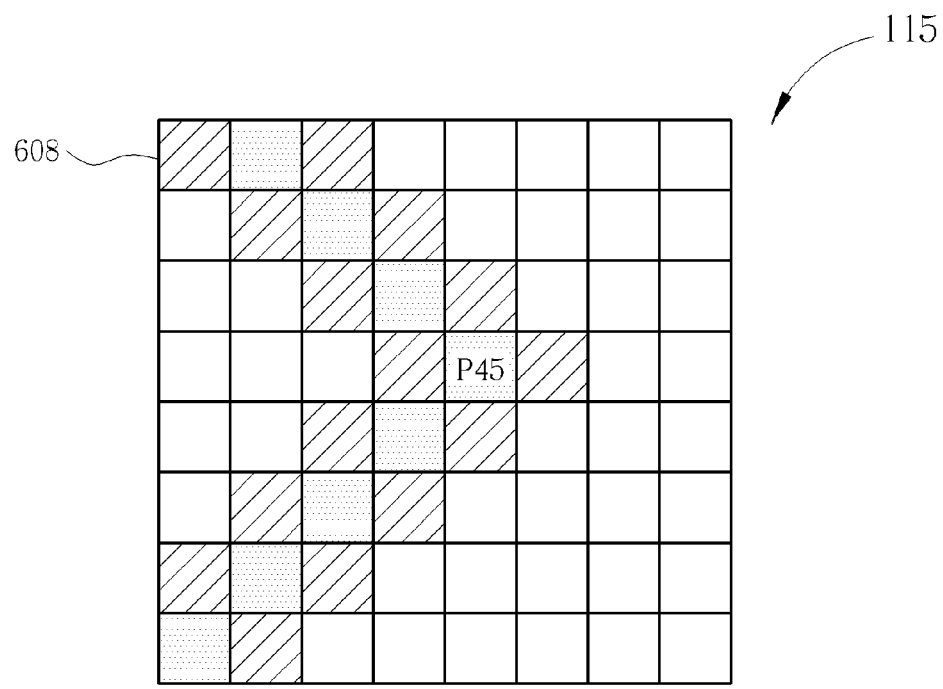
FIG. 6E is a diagram illustrating another effective sensing region determined by the determining circuit according to the moving inertia results of the feature point shown in FIG. 6C.

Please refer to FIG. 6C-FIG. 6E. FIG. 6C is a diagram illustrating the feature points FT moving at a different moving velocity. FIG. 6D and FIG. 6E are diagrams illustrating an effective sensing region 606 and an effective sensing region 608 respectively determined by the determining circuit 110 according to the moving inertia result (moving velocity) of the feature point FT shown in FIG. 6C. As shown in FIG. 6C, the current location of the feature point FT is at the location P41. In fact, the feature point FT moves straight toward the right at a speed of four times the distance between adjacent sensing units. In other words, the feature point FT will move to the location P45 at the next timing. When the detecting circuit 105 detects that the moving velocity of the feature point FT is four times the distance between adjacent sensing units for each timing, the determining circuit 110 determines that the possible location of the feature point FT at the next timing falls in the region composed of sensing units around the current location P41 with a distance of four sensing units. Therefore, the determining circuit 110 determines that the possible location of the feature point FT at the next timing is within the screen tone region 606 as shown in FIG. 6D. Hence, it can be determined that the effective sensing region of the image sensing array 115 is composed of the sensing units within the screen tone region 606. In other words, while the feature point FT is being detected at the next timing, only sensing units within the screen tone region 606 will be turned on for the image sensing operation, and other sensing units will be turned off. Thus, when the location of the feature point FT is actually moved to the location P45, only the sensing units within the screen tone region 606 that are turned on for image sensing operation can detect the feature points FT actually and reduce power consumption at the same time. In addition, considering the condition that the estimation of the location of the feature points FT at the next timing may have errors or the moving inertial of the feature point FT slightly changes, when the detecting circuit 105 detects that the moving velocity of the feature point FT is four times the distance between adjacent sensing units for each timing, the determining circuit 110 may also determines that the possible location of the feature point FT at the next timing is located at the region 608, including the screen tone region and the hatched region. Equivalently, the region 608 includes the sensing units of the screen tone region 606 and the neighboring sensing units of the hatched region. Therefore, the probability of identifying the exact location of the feature point FT at the next timing will be increased. In addition, compared to the region 606, the region 608 has the extra sensing unit range which may be regarded as the estimation error range used to compensate for the possible direction deviation between the predicted moving inertia and the actual moving inertia, so that the feature point FT can still be detected at the next timing.

Figure 7A:
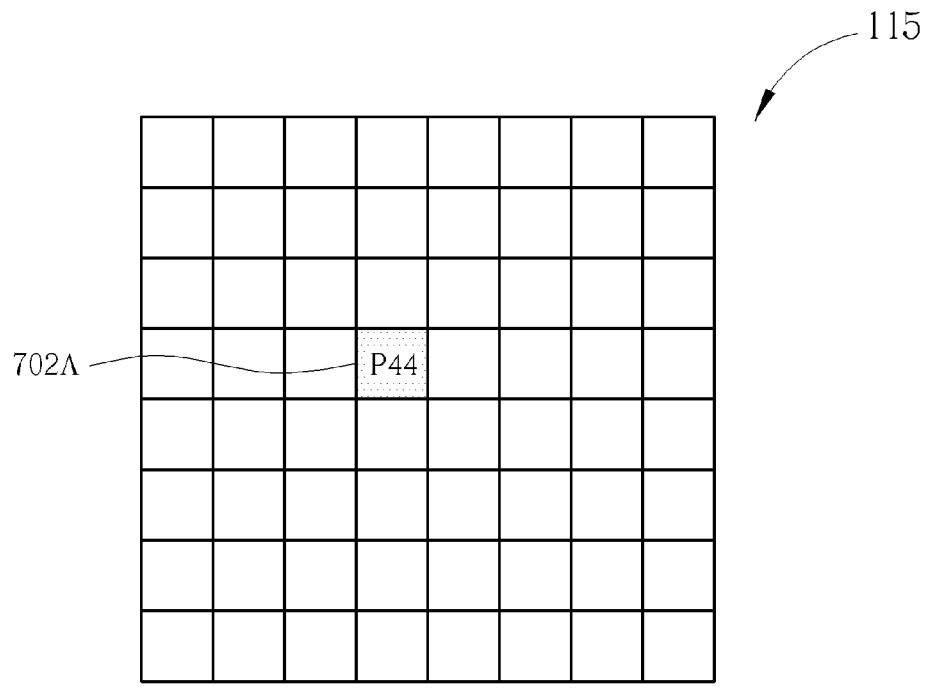
FIG. 7A is a diagram illustrating an effective sensing region determined by the determining circuit according to the moving speed of the feature point shown in FIG. 5A.
Figure 7B:
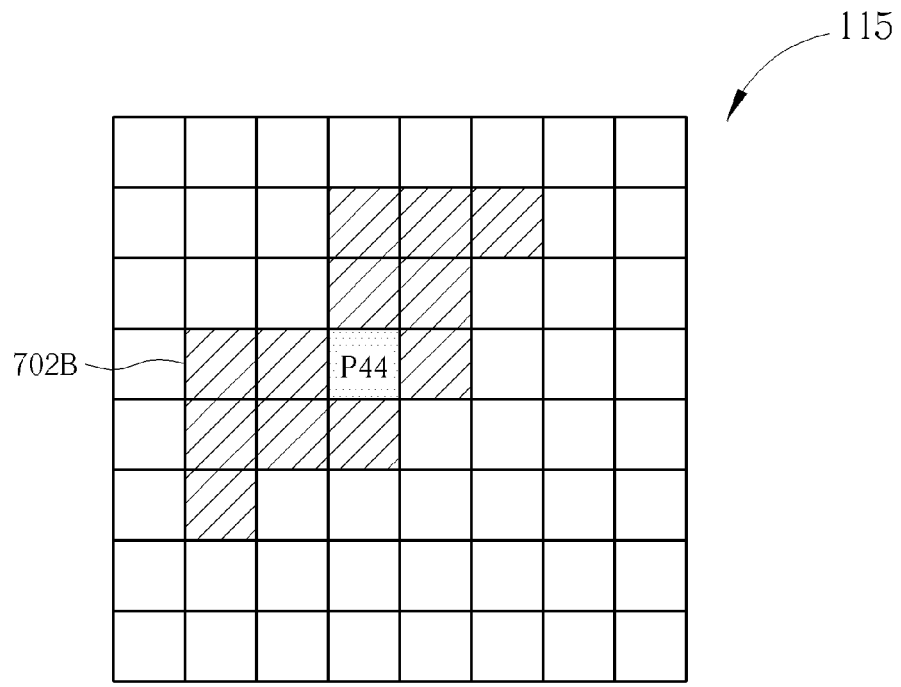
FIG. 7B is a diagram illustrating another effective sensing region determined by the determining circuit according to the moving speed of the feature point shown in FIG. 5A.
Figure 7C:
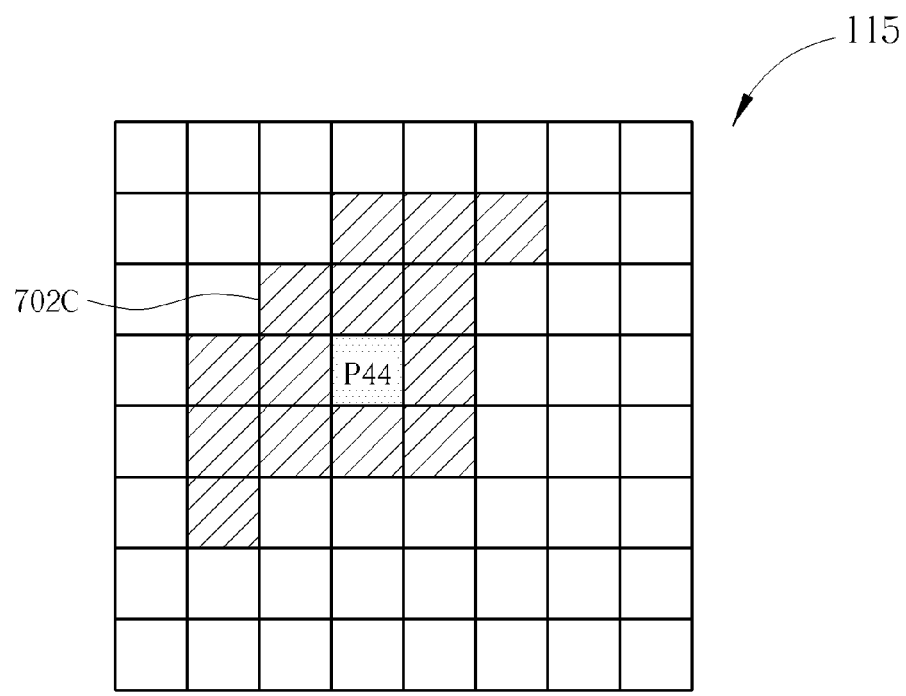
FIG. 7C is a diagram illustrating yet another effective sensing region determined by the determining circuit according to the moving speed of the feature point shown in FIG. 5A.

Besides, the detecting circuit 105 may detect the moving inertia of the feature point FT according to the moving speed of the feature point FT (including the moving direction and moving velocity), wherein the operation of detecting the moving speed can be achieved by detecting or computing the motion vector between a plurality of images of the feature point FT. After the moving speed is obtained, the moving inertia can be calculated or determined correspondingly. The determining circuit 110 determines or adjusts the size or range of the effective sensing region of the image sensing array 115 according to the moving speed indicated by the moving inertial. Please refer to FIG. 5A in conjunction with FIG. 7A. FIG. 5A shows that the feature points FT actually moves from the current location P22 to location P44 at the next timing, and the motion vector detected by the detecting circuit 105 indicates that the moving speed (including direction and velocity) of the feature point FT. FIG. 7A is a diagram illustrating an effective sensing region 702A determined by the determining circuit 110 according to the moving speed of the feature point FT shown in FIG. 5A. As shown in FIG. 7A, since the moving inertial indicates the direction and velocity of the feature point FT, the determining circuit 110 can predict that the feature point FT will appear at the location P44 at the next timing. Accordingly, in this embodiment, the objective of detecting the feature point FT and reducing power consumption can also be achieved when the effective sensing region 702A only includes the sensing unit at the location P44. Furthermore, in another embodiment, the determining circuit 110 can also determine the region 702B shown in FIG. 7B as the effective sensing region. It should be noted that the region 702B includes the sensing unit of the region 702A (i.e., the location P44) and the neighboring sensing units of the hatched region, equivalently. Therefore, the probability of identifying the exact location of the feature point FT at the next timing will be increased. In addition, compared with the region 702A, the region 702B has the extra sensing unit range which may be regarded as the estimation error range used to compensate for the possible direction deviation between the predicted moving inertia and the actual moving inertia, so that the feature point FT can still be detected at the next timing. Besides, in another embodiment, the determining circuit 110 adjusts the effective sensing region to a larger range (e.g., the region 702C shown in FIG. 7C, which includes the location P44 and the hatched region), which also falls into the scope of the present invention.

Figure 8A:
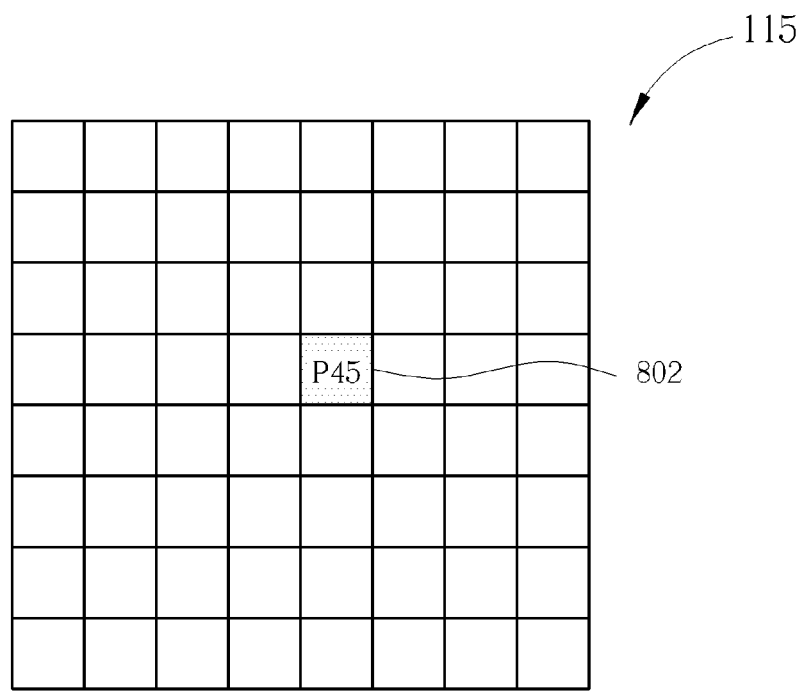
FIG. 8A is a diagram illustrating an embodiment of the effective sensing region determined by the determining circuit in accordance with the moving speed inertia result of the feature point shown in FIG. 6C.
Figure 8B:
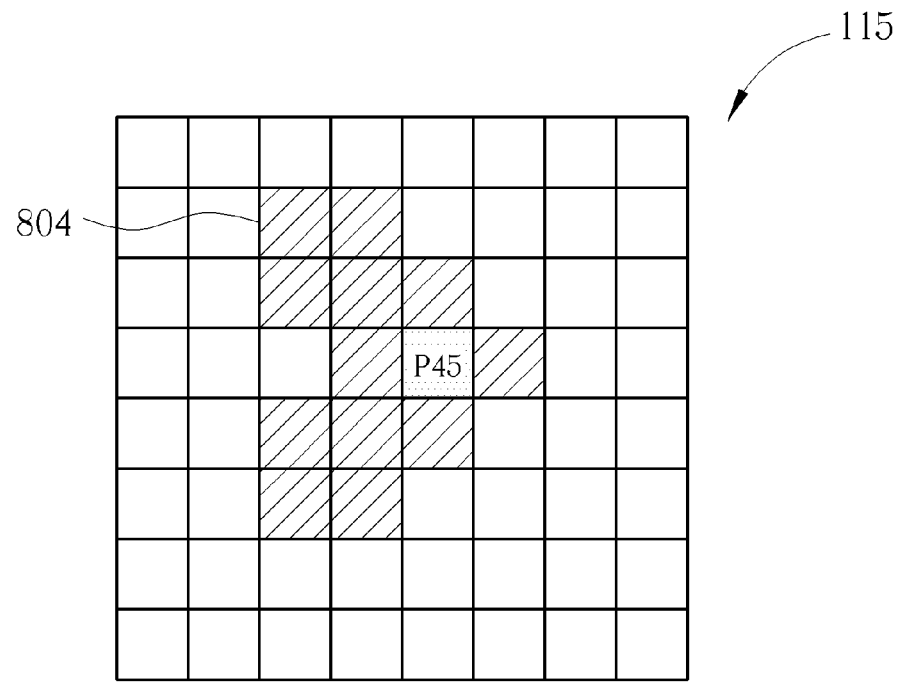
FIG. 8B is another diagram illustrating an embodiment of the effective sensing region determined by the determining circuit in accordance with the moving speed inertia result of the feature point shown in FIG. 6C.
Figure 8C:
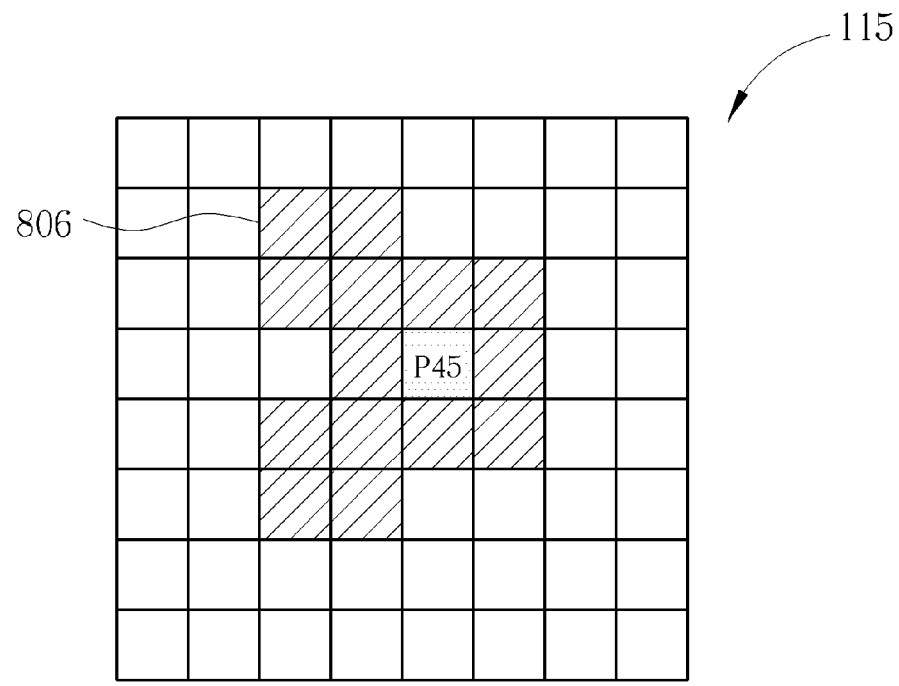
FIG. 8C is yet another diagram illustrating an embodiment of the effective sensing region determined by the determining circuit in accordance with the moving speed inertia result of the feature point shown in FIG. 6C.

Furthermore, when the moving speed of the feature point FT detected by the detecting circuit 105 are changing, the corresponding moving inertias will make the determining circuit 110 determine or adjust the effective sensing region to be different from each other. Please refer to FIG. 6C in conjunction with FIG. 8A-FIG. 8C. FIG. 8A-FIG. 8C are diagrams illustrating different embodiments of the effective sensing region 802, 804, 806 determined by the determining circuit 110 in accordance with the moving speed inertia result of the feature point FT shown in FIG. 6C. The moving inertia is detected by the detecting circuit 105 according to the moving speed (including moving direction and moving velocity) of the detected feature point FT. The determining circuit 110 determines or adjusts the size and range of the effective sensing region of the image sensing array 115 according to the moving speed indicated by the moving inertia, as shown in FIG. 6C. Actually, the feature point FT moves from the location P41 to the next location P45, and the motion vector detected by the detecting circuit 105 indicates the moving speed (including direction and velocity) of the feature point FT. As shown in FIG. 8A, since the moving inertia can indicate the direction and velocity of the feature point FT, the determining circuit 110 therefore can predict that the feature point FT will appear at the location P45 at the next timing. In this embodiment, the objective of detecting the feature point FT and reducing power consumption can also be achieved when the effective sensing region 802 only includes the sensing unit at the location P45. Furthermore, in another embodiment, the determining circuit 110 can also determine the region 804 (including the location P45 and the hatched region) shown in FIG. 8B as the effective sensing region. It should be noted that the region 804 includes the sensing unit of the region 802 and the neighboring sensing units of the hatched region, equivalently. Therefore, the probability of identifying the exact location of the feature point FT at the next timing will be increased. In addition, compared with the region 802, the region 804 has the extra sensing unit range which may be regarded as the estimation error range used to compensate for the possible direction deviation between the predicted moving inertia and the actual moving inertia, so that the feature point FT can still be detected at the next timing. Besides, in another embodiment, the determining circuit 110 adjusts the effective sensing region to a larger range (e.g., the region 806 shown in FIG. 8C, which includes the location P45 and the hatched region). This also falls into the scope of the present invention.

Figure 9:
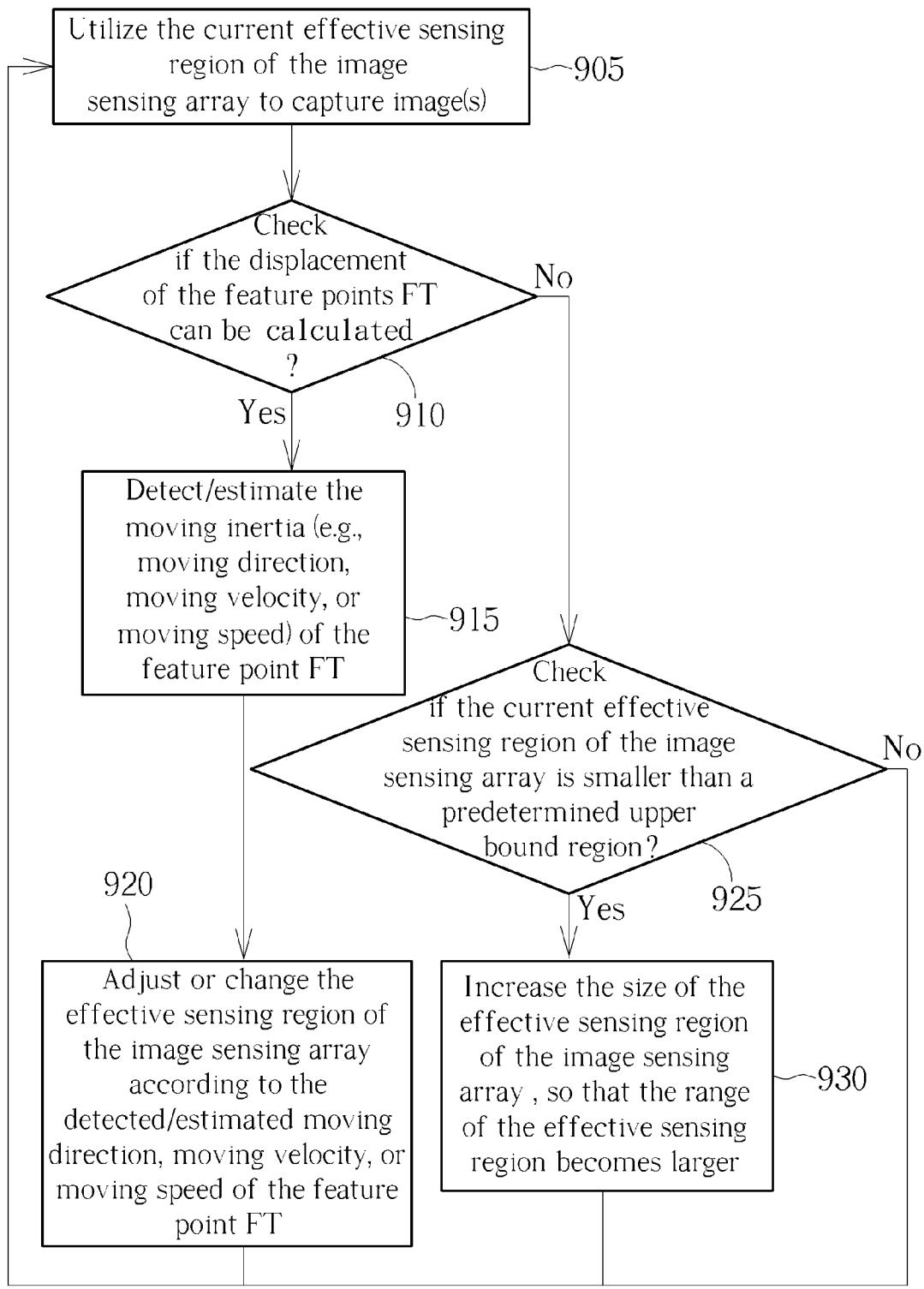
FIG. 9 is a flowchart illustrating an optical navigation method according to an exemplary embodiment of the present invention.

In order to allow readers to more clearly understand the detailed operation of dynamically changing the effective sensing region of the image sensor array 115 in the above-described embodiment of the present invention, please refer to FIG. 9, which is a flowchart illustrating an optical navigation method according to an exemplary embodiment of the present invention. Provided that substantially the same result is achieved, the steps of the flowchart shown in FIG. 9 need not be in the exact order shown and need not be contiguous, that is, other steps can be intermediate. Besides, some steps in FIG. 9 may be omitted according to various embodiments or requirements. The method may be briefly summarized as follows.

Step 905: Utilize the current effective sensing region of the image sensing array 115 to capture image(s);

Step 910: Check if the displacement of the feature points FT can be calculated. If yes, perform step 915, else, perform step 925;

Step 915: Detect/estimate the moving inertia (e.g., moving direction, moving velocity, or moving speed) of the feature point FT;

Step 920: Adjust or change the effective sensing region of the image sensing array 115 according to the detected/estimated moving direction, moving velocity, or moving speed of the feature point FT;

Step 925: Check if the current effective sensing region of the image sensing array 115 is smaller than a predetermined upper bound region. If yes, perform step 930, else, perform step 905. For example, the predetermined upper bound region may be the sensing region of the entire frame of the image sensing array 115;

Step 930: Increase the size of the effective sensing region of the image sensing array 115, so that the range of the effective sensing region becomes larger.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation method, comprising:
 optically detecting a moving inertia of a feature point using a plurality of images captured with an image sensing array; and
 determining an effective sensing region of the image sensing array according to the detected moving inertia for reducing power consumption, comprising:
  estimating a next location of the feature point at next timing according to the moving inertia; and
  determining the effective sensing region which is turned on in the image sensing array according to the next location of the feature point at the next timing;
 wherein a plurality of sensing units included within the effective sensing area is at least composed by multiple sensing units that are not closely adjacent to each other, the effective sensing area comprising sensing units of the image sensing array; and, the multiple sensing units, not closely adjacent to each other, are formed by alternatively spacing turned-on sensing units and not-turned-on sensing units.

2. The optical navigation method of claim 1, wherein the step of detecting the moving inertia of the feature point comprises:
 detecting locations of the feature point on a plurality of images to calculate a motion vector; and
 calculating the moving inertia according to the motion vector.

3. The optical navigation method of claim 2, wherein the moving inertia is a moving velocity.

4. The optical navigation method of claim 2, wherein the moving inertia is a moving direction.

5. The optical navigation method of claim 1, wherein the moving inertia is a moving direction, and the step of estimating the next location of the feature point at the next timing performs estimation according to the moving direction, and the effective sensing region which is turned on in the image sensing array comprises a straight line shaped region along the moving direction.

6. The optical navigation method of claim 1, wherein the moving inertia is a moving direction, and the step of estimating the next location of the feature point at the next timing performs estimation according to the moving direction, and the effective sensing region which is turned on in the image sensing array comprises a radial region along the moving direction.

7. The optical navigation method of claim 1, wherein the moving inertia is a moving velocity, and the step of estimating the next location of the feature point at the next timing according to the moving inertia comprises:
 estimating the next location of the feature point at the next timing according to the moving velocity, wherein the estimated location at the next timing comprises a plurality of candidate locations.

8. The optical navigation method of claim 7, wherein the step of determining the effective sensing region which is turned on in the image sensing array according to the next location of the feature point at the next timing comprises:
 determining the effective sensing region according to the plurality of candidate locations and a plurality of corresponding neighboring regions.

9. The optical navigation method of claim 7, wherein the candidate locations are locates in different directions, respectively.

10. An optical navigation apparatus, comprising:
- a detecting circuit, arranged for optically detecting a moving inertia of a feature point using a plurality of images captured with an image sensing array; and
- a determining circuit, coupled to the detecting circuit, arranged for determining an effective sensing region of the image sensing array according to the detected moving inertia for reducing power consumption, wherein the determining circuit estimates a next location of the feature point at the next timing according to the moving inertia, and determines the effective sensing region which is turned on in the image sensing array according to the next location of the feature point at the next timing;
- wherein a plurality of sensing units included within the effective sensing area is at least composed by multiple sensing units that are not closely adjacent to each other, the effective sensing area comprising sensing units of the image sensing array; and, the multiple sensing units, not closely adjacent to each other, are formed by alternatively spacing turned-on sensing units and not-turned-on sensing units.

11. The optical navigation apparatus of claim 10, wherein the detecting circuit detects locations of the feature point on a plurality of images to calculate a motion vector, and calculates the moving inertia according to the motion vector.

12. The optical navigation apparatus of claim 11, wherein the moving inertia is a moving velocity.

13. The optical navigation apparatus of claim 11, wherein the moving inertia is a moving direction.

14. The optical navigation apparatus of claim 10, wherein the moving inertia is a moving direction, and the determining circuit estimates the next location of the feature point at the next timing according to the moving direction, and the effective sensing region which is turned on in the image sensing array comprises a straight line shaped region along the moving direction.

15. The optical navigation apparatus of claim 10, wherein the moving inertia is a moving direction, and the determining circuit estimates the next location of the feature point at the next timing according to the moving direction, and the effective sensing region which is turned on in the image sensing array comprises a radial region along the moving direction.

16. The optical navigation apparatus of claim 10, wherein the moving inertia is a moving velocity, and the determining circuit estimates the next location of the feature point at the next timing according to the moving velocity, where the estimated location at the next timing comprises a plurality of candidate locations.

17. The optical navigation apparatus of claim 16, wherein the determining circuit determines the effective sensing region according to the candidate locations and a plurality of corresponding neighboring regions.

18. The optical navigation apparatus of claim 16, wherein the candidate locations are located in different directions, respectively.

* * * * *